Sept. 17, 1963    W. G. HIBBERT ETAL    3,104,193
SELECTIVE APPARATUS FOR THE MOUNTING OF COINS ON MAILING CARDS
Filed Sept. 29, 1960    4 Sheets-Sheet 1

INVENTORS
WAYNE G. HIBBERT &
ROBERT G. McHUGH
BY
ATTORNEYS

Sept. 17, 1963　　　W. G. HIBBERT ETAL　　　3,104,193
SELECTIVE APPARATUS FOR THE MOUNTING OF COINS ON MAILING CARDS
Filed Sept. 29, 1960　　　　　　　　　　　　　　4 Sheets-Sheet 2

INVENTORS
WAYNE G. HIBBERT &
ROBERT G. McHUGH
BY
ATTORNEYS

Sept. 17, 1963  W. G. HIBBERT ETAL  3,104,193
SELECTIVE APPARATUS FOR THE MOUNTING OF COINS ON MAILING CARDS
Filed Sept. 29, 1960  4 Sheets-Sheet 3

INVENTORS
WAYNE G. HIBBERT &
ROBERT G. McHUGH
BY
Busser, Smith & Harding
ATTORNEYS Sept. 17, 1963 W. G. HIBBERT ETAL 3,104,193
SELECTIVE APPARATUS FOR THE MOUNTING OF COINS ON MAILING CARDS
Filed Sept. 29, 1960 4 Sheets-Sheet 4

INVENTORS
WAYNE G. HIBBERT &
ROBERT G. McHUGH
BY
ATTORNEYS

United States Patent Office 3,104,193
Patented Sept. 17, 1963

3,104,193
SELECTIVE APPARATUS FOR THE MOUNTING
OF COINS ON MAILING CARDS
Wayne G. Hibbert, 323 Concord Ave., Trenton, N.J., and
Robert G. McHugh, 19 S. Canal St., Yardley, Pa.
Filed Sept. 29, 1960, Ser. No. 59,302
5 Claims. (Cl. 156—350)

The invention relates to apparatus for use in direct mailing systems where it is desired to mount on cards different denominations and combinations of coins, tokens or the like which are to be mailed for purposes of redemption or promotional activities.

In a multitude of business operations there is involved as an aspect of the business a distribution of coins through the mails. For example, many companies make it a practice, as a part of sales promotion, to redeem money to customers who send in box tops, wrappers, coupons, etc. Telephone companies also are faced with the problem of returning money to customers who have deposited excess tolls in public telephones, and some companies may have a particular problem in returning money to customers who inadvertently have remitted amounts greater than due on their accounts. Generally, such problems are handled by direct mail houses, which provide the service to mailing currency in accordance with addresses and other information supplied to them. A further function of direct mail systems is the distribution of coins or tokens in connection with sales promotion campaigns.

At present, the most widely employed method of preparing coins for mailing involves the use of cards having cut-out tabs which hold the coins in place. The coins must be slipped under these tabs manually, there being to our knowledge no suitable machinery for performing this operation. The manual mounting of coins on cards is prevalent especially for the reason that various addresses quite often receive coins of different face values. Other methods of mounting coins have been employed, such as the use of small envelopes or adhesive taping, but again the mounting operations are carried out manually.

It is the main object of the invention to provide apparatus which is adapted to automatically mount coins of various denominations and combinations on cards as may be selected at will. Briefly, in accordance with the specifically disclosed form of the invention, adhesive is applied to a card in a preselected pattern of points, on which a preselected combination of coins of different denominations thereafter are placed. Following this mounting of coins an automatic inspection is effected, followed by folding, inserting in envelopes and postage metering.

Further objects and advantages will become apparent from the following description, read in conjunction with the accompanying drawings in which.

*General Description*

The apparatus is intended to handle ordinary cards, measuring 6 x 6½ inches for example, which are fed thereto manually or by conventional card feeding means indicated at I. The cards are carried by a belt 2 past a glue applicator II which, when the presence of the card is sensed by a photoelectric relay, applies spots of glue at predetermined points on the card. The applicator II, of course, may apply spots of ordinary quick drying glue or pressure sensitive adhesive to the card. The card is then conveyed by the belt 2 to the coin dispenser III, which has been preset to drop coins on the same points of the card at which spots of glue have been applied. This operation of the coin dispenser III also is triggered when a photoelectric relay sensitive to the reflection of light from the card detects its presence under the coin dispenser. In the next step, the belt conveys the card beneath an inspection unit IV, which will interrupt operation of the belt drive if coins are not detected at all the points where they should be present on the card. Each of the glue applying (II), coin dispensing (III) and inspecting (IV) means have selecting means whereby they can be preset to operate only on selected points of the card. In other words, the glue applicator II will apply glue only at certain points on which coins, possibly of different denominations, are to be dropped by the coin dispenser, and likewise the inspection unit IV will inspect for the presence of coins only at the points at which the coin dispenser III was set to drop them. As will be described more fully hereafter, the coordination of these operations may be effected from a single keyboard, or by respective banks of switches at the glue applicator II, the coin dispenser III and the inspection unit IV. Following the mounting of the desired combination of coins as briefly described, the cards pass to a folder V, which folds a portion of the card over the portion on which the coins have been mounted. This may be followed by a machine VI for inserting the cards in pre-addressed envelopes and by a postage metering machine VII.

*Glue Application*

Figure 1:
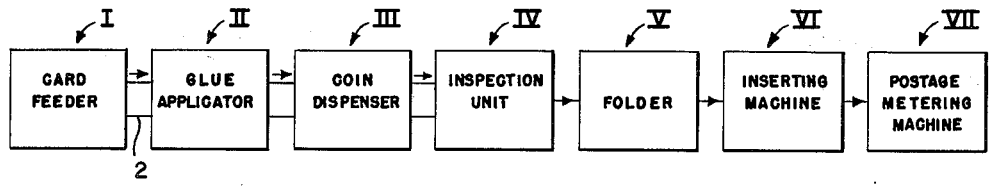
FIGURE 1 is a block diagram illustrating the sequence of operations involved in preparing coins for mailing in accordance with the invention.
Figures 2, 3:
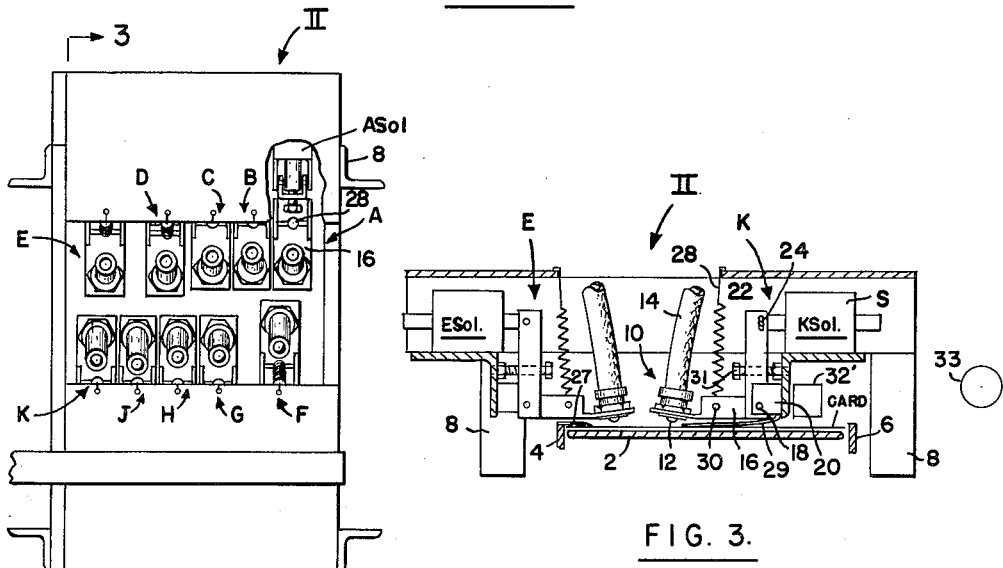
FIGURE 2 is a plan view of the glue applying means.
FIGURE 3 is a vertical cross-section of the glue applicator, taken on line 3—3 in FIGURE 2.

Referring now to FIGURES 2 and 3, as will be evident from the plan view in FIGURE 2 the glue applicator II comprises a plurality of individual glue applying units designated A, B, C, D, E, F, G, H, J, and K. As a card passes beneath this assembly of units, in a direction from the right to the left in FIGURE 2, certain preselected units are lowered for a short instant of time to apply spots of glue to the card, which will be identified as such in FIGURE 3 and in other figures. All of the individual glue applying units are identical, the only difference in their arrangement being that certain units are disposed differently with respect to the card depending upon the size of coins that are to be secured. Therefore, only one of these units, namely glue applying unit K, will be described as typical of all the units. Referring then to FIGURE 3, the conveyor belt is indicated at 2 and is bounded at its edges by card guiding members 4 and 6. The overall assembly is supported in a structural framework generally indicated at 8. Each of the actual glue applying means comprises a spring loaded ball valve assembly 10, the ball being indicated at 12, and a flexible conduit 14 provided to supply liquid glue under pressure. The assemblies 10 per se are conventional in the art and are somewhat similar to a ball point pen, in that upon movement of the assembly 10 downwardly to bring the ball 12 into contact with a card or the like a valve thereby is unseated to permit glue to flow around the ball, which rolls over the card and applies glue thereto. It will be understood that each flexible conduit 14 leads to a glue reservoir, not shown, which is pressurized by compressed gas. Each spring loaded ball valve assembly 10 is mounted on a bell crank lever 16 which is pivotally mounted at 18 to a pair of ears 20 extending from the common framework. The upper arm 22 of the lever is pivotally connected at 24 to the armature of a solenoid S, the arrangement being such that lever 16 is driven in a counterclockwise direction when this solenoid is energized. Such counterclockwise movement is limited by a stop screw 31 passing through the front face of the channel shaped lever 16 and is resisted by a spring 28 connected to the lever at 30. It will be evident that thereby each of the assemblies 10 is adapted to be brought into engagement with the card to apply a spot of glue thereto.

Fingers 27 and 29, in the form of flat spring members, are mounted adjacent the assemblies 10. These fingers, 27 and 29, lightly engage the card and their purpose is to prevent the lifting of the card off the belt 2, due to tackiness of glue on balls 12, when the assemblies are raised.

The pickup 32′ of a photoelectric relay is mounted at the side of the bank of glue applying units A, B, C, etc. and a source of light is provided by a fluorescent lamp 33. As is well understood in the art, various mechanisms may have their operations triggered or controlled responsive to the detection by a photoelectric relay of light reflected from a card or the like. Thus, in the present case, the operation of the glue applying units A, B, C, etc. is triggered by the passing of a card beneath the photoelectric relay pickup 32′, this being caused of course by the reflection of light from the white card. It will be understood that the reflectivity of the card will differ from that of the relatively dark belt 2, and that normally the reflection from belt 2 will not be sufficient to trigger the photoelectric relay.

Figure 4:
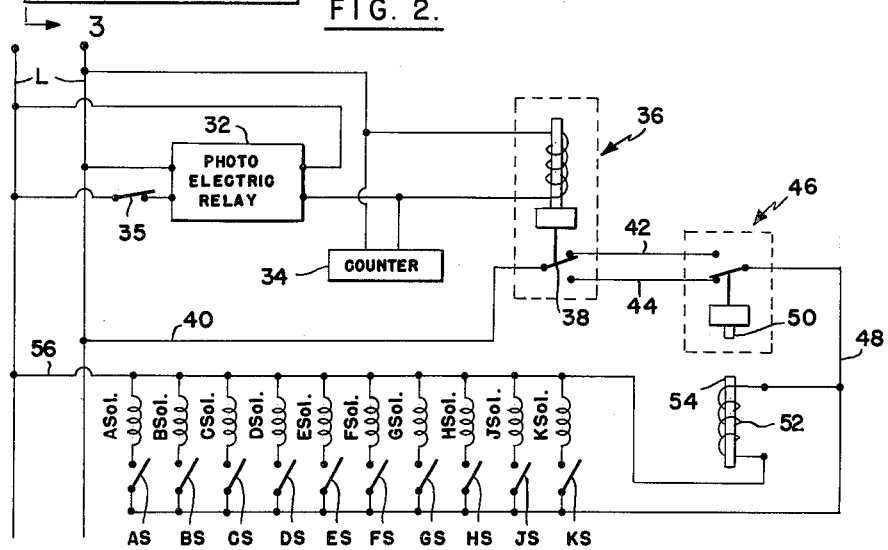
FIGURE 4 is a wiring diagram of the electrical controls for the apparatus shown in FIGURES 2 and 3.

The foregoing operation of the glue applicator II will be more evident from FIGURE 4. Reference has been made to the solenoid S for operating the glue applying unit K, which has been specifically described in connection with FIGURE 3. Actually, each such unit has its individual solenoid and the nomenclature that will be used to describe the control system will involve designation of the solenoid for unit A as "ASol.," the designation of the solenoid for unit B as "BSol.," etc. Thus there are shown in FIGURE 4 ten solenoids: ASol., BSol., CSol., DSol., ESol., FSol., GSol., HSol., JSol., and KSol. The solenoids ESol. and KSol. are shown in FIGURE 3. In series with each of these solenoids there is provided a manually operable switch, and the nomenclature for these switches will involve "AS" to designate the switch for the A unit solenoid, the use of "BS" to designate the switch for the B unit solenoid, etc. Thus, there are shown in FIGURE 4 the switches AS, BS, CS, DS, ES, FS, GS, HS, JS, and KS. The selection of glue applying units A, B, C, etc. to apply spots of glue to the card is effected by the selective closing of certain switches AS, BS, CS, etc. For example, if it is desired to apply spots of glue at the locations of units A, E and F, switches AS, ES, and FS are closed while the remaining switches of the series remain open.

The photoelectric relay is indicated at 32 and is energized from power lines L, there being provided a switch 35 which may be manually opened to deenergize the relay 32. The secondary or controlled circuit of the relay 32 includes a counter 34 and single pole, double-throw ratchet relay 36. The counter 34, of course, serves to record the number of cards which are fed through the apparatus. The double-throw switch 38 of relay 36 is adapted to connect a line 40 with either of lines 42 and 44. Relay 36 is of the ratchet type, which means that on one energization it will establish and hold contact between lines 40 and 42, and on the next energization it will establish and hold contact between lines 40 and 44. In other words, on each energization of relay 36 switch 38 will move from one position to the other.

A single pole, double-throw push switch 46 is adapted to connect a line 48 to either of the aforementioned lines 42 and 44. Switch 46 has an operating button 50, and each time this button is pushed the switch will move from the position which it is in to the opposite position. The button 50 must be released and pushed a second time to effect movement of the switch back to its original position, and in this sense the switch 46 is similar to relay 36. A solenoid 52 is connected in series with switch 46 and relay 36, and has its armature 54 positioned to strike the button 50 when energized. By varying the throw of armature 54 there may be effected a variable delay between the energization of solenoid 52 and the operation of switch 46 by armature 54. It will be noted that the series of solenoids ASol., BSol., CSol., etc. and switches AS, BS, CS, etc. also are connected in series with switches 46 and 38.

The operation of the glue applicator II will now be described. Assume that it is desired to apply spots of glue at the location of each of the glue applying units A, B, C, etc. in FIGURE 2. Each of the series of switches AS, BS, CS, etc. then will be closed. However, if only certain units are to be placed in operation, only their corresponding switches will be closed and the remaining switches will remain open. Assume that the relay 36 and push switch 46 are in their respective positions illustrated in FIGURE 4. As a card passes beneath the glue applicator II photoelectric relay 32 will respond to the reflection of light from the card to energize the solenoid of the ratchet relay 36 in its secondary or controlled circuit. This will cause the switch 38 to make contact with the lower line 44, thereby completing a circuit through line 40, switch 38, line 44, push switch 46, line 48 and solenoid 52. A circuit also will be completed from line 48 through the respective solenoids ASol., BSol., CSol., etc. which have been activated by the closing of their respective switches. If the switch KS is closed, for example, KSol. will be energized to drive lever 16 in a counterclockwise direction and thereby bring the spring loaded ball valve 10 into engagement with the card, applying glue thereto. The ball 12, however, is held in engagement with the card for only an instant, for the reason that as soon as solenoid 52 is energized its armature 54 will begin to move toward and strike the button 50 of push switch 46, which will effect the moving of switch 46 to its alternate position wherein the circuit to the series of solenoid ASol., BSol., CSol., etc. is broken. It will be recalled that the energization of relay 36 by photoelectric relay 32 causes switch 38 to move to and remain in its lower position, but now the circuit is broken by switch 46 moving to and remain in its upper position. The deenergization of solenoid KSol., of course, effects the release of assembly 10 from the card through the action of spring 28. The leaf spring elements 27 and 29 serve to prevent the lifting of the card by adhesion thereof to the ball 12, as previously mentioned.

*Coin Dispenser*

Figure 5:
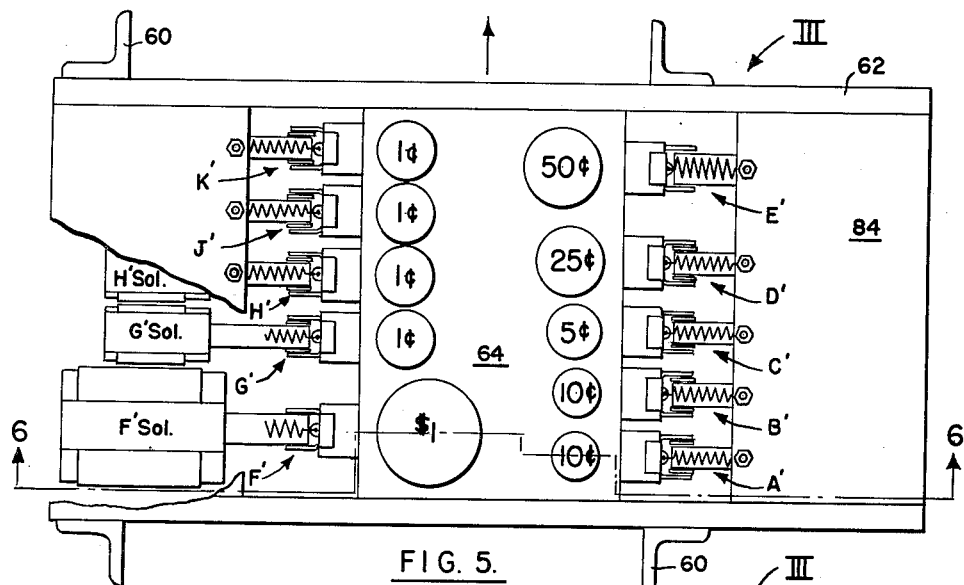
FIGURE 5 is a plan view of the coin dispenser.
Figure 6:
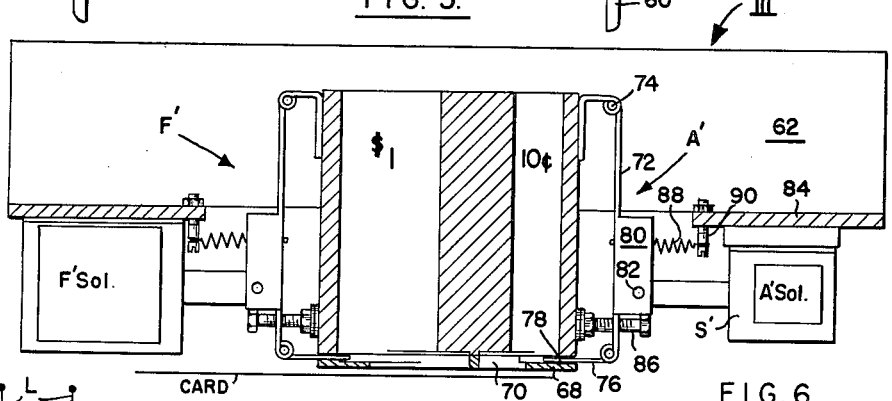
FIGURE 6 is a vertical cross-section of the coin dispenser, taken on line 6—6 in FIGURE 5.

Referring to FIGURES 5 and 6, the conveyor belt 2 carries the card directly beneath the coin dispenser III in a direction which is upward as viewed in FIGURE 5 and away from the viewer in FIGURE 6. The coin dispenser III is supported by a structural framework comprising, mainly, upright members 60 and cross bars 62. Positioned over that transverse portion of the cards' path of movement at which coins are to be mounted is a coin block, formed of plastic or the like, having a plurality of cylindrical coin receiving bores. These bores are identified in plan view in FIGURE 5 by designation of its respective coin size. Thus it will be seen that there are four bores of a size particularly intended for stacking pennies. In the same, left hand row there is a bore sized to receive a stack of one dollar coins. In the opposite row there is one bore for fifty cent pieces, one bore for twenty-five cent or quarter pieces, one bore for five cent pieces or nickels, and two bores for ten cent pieces or dimes. The lower end of each bore is specially constructed to cooperate with an ejector mechanism, and since the structural arrangement for each of these bores is identical only one of them will be described with reference to FIGURE 6. FIGURE 6 is a vertical cross-section through the particular bores adapted to receive silver dollars and dimes, respectively. The ten cent coin bore terminates in an obstructing wall 68 and an opening 70 which is offset from the axis of this bore. The ejector mechanism comprises an arm 72 which is pivotally mounted to block 64 at 74 and has a flat finger 76 extending through a narrow slot 78 in the side wall of block 64. The arm 72 has ears 80 to which is pivotally connected the armature of a solenoid S'. Solenoid S' is supported by a plate 84 provided to similarly support a bank of such solenoids. The purpose of the solenoid S' is to reciprocate the flat finger 76 between inner and outer positions, the operation being such that as the finger moves inwardly it slides the lowermost coin into a position over the opening 70, whereupon it drops onto the card. Return movement, i.e. outward movement, is effected by a spring 88 connected between arm 72 and an anchoring screw 90. Further specific description of the coin ejection apparatus is unnecessary, as it will be understood that suitable apparatus is conventional and well known in the art.

Each of the coin ejection units A', B', C', etc. is operated by its own individual solenoid, and the nomenclature employed will involve the designation of the solenoid for unit A' as "A'Sol.," the solenoid for unit B' as "B'Sol.," and so forth. Thus, referring to FIGURE 7, there are shown the solenoids A'Sol., B'Sol., C'Sol., D'Sol., E'Sol., F'Sol., G'Sol., H'Sol., J'Sol., and K'Sol. In the case of any given card, naturally it will be desired to dispense only some or possibly all of the coins designated in FIGURE 5, as determined by operation of the individual units A', B', C', etc. Whether any of these units operates, of course, is determined by whether or not its respective solenoid S' is energized at the appropriate time. Accordingly, for the purpose of selecting the coin ejection units which are to operate, individual switches are provided to connect or disconnect the operating solenoids from the circuit in much the same manner as the solenoids ASol., BSol., etc. in FIGURE 4.

Accordingly, the nomenclature employed will involve the designation of the manually operable switch for A'Sol. as "A'S," the designation of the manually operable switch for B'Sol. as "B'S" and so forth. Thus in FIGURE 7 there are shown the corresponding switches A'S, B'S, C'S, D'S, E'S, F'S, G'S, H'S, J'S, and K'S. It will be understood, for example, that if it is desired to have the coin dispenser III operate so that any given card is to dispense $1.60, the switch A'S for the ten cent unit A', the switch E'S for the fifty cent unit E', and switch F'S for the one dollar unit F' are closed, while the remaining switches are opened.

Figure 7:
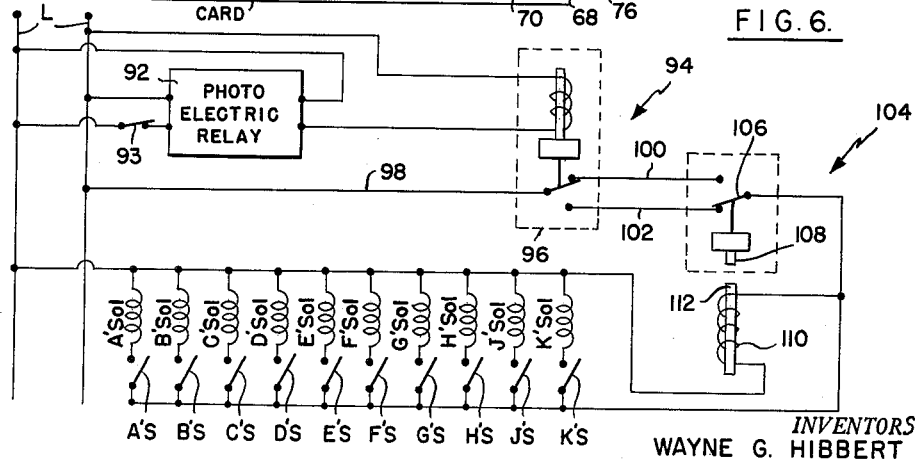
FIGURE 7 is a wiring diagram of the electrical controls for the apparatus shown in FIGURES 5 and 6.

The operation of the coin dispenser III is triggered by a photoelectric relay, indicated at 92 in FIGURE 7, in the same manner as the operation of the glue applicator II previously described. In other words, as the card passes beneath the coin dispenser III this is detected by the photoelectric relay 92 due to the increased reflection of light from the card. A switch 93 may be opened manually to shut down the coin dispenser III. A single pole double-throw ratchet relay 94 is connected in the secondary or control circuit of the photoelectric relay 92, and has a switch 96 adapted to connect a line 98 with either of lines 100 and 102. Relay 94 is similar to the previously described relay 36 in FIGURE 4, in that on each separate energization it moves to its opposite position. Therefore, on one energization of relay 94, due to the passing of a card below photoelectric relay 92 switch 96 might break contact with line 100 and establish contact with line 102 while on the next energization, caused by the next card passing below photoelectric relay 92, switch 96 will break contact with line 102 and establish contact with line 100.

A single pole double-throw push switch 104 is connected in series with line 98, switch 96, and lines 100 and 102. Push switch 104 is similar to the previously described switch 46. Thus, when the push button 108 is struck a first time the switch 106 will establish contact with line 100, and when it is released and struck a second time it will break contact with line 100 and re-establish contact with line 102. The push button 108 is positioned to be struck by the armature 112 of a solenoid 110 connected in series with the switch 104, the adjustment of the throw of armature 112 being effective to vary the delay in operation of switch 104 following energization of solenoid 110. Also connected in series with the switches 96 and 104 is the bank of solenoids A'Sol., B'Sol., C'Sol., etc.

The operation of the coin dispenser will now be described. First, it will be noted that spots of glue were applied to the card at certain points thereof as determined by the selection of switches AS, BS, CS, etc. in FIGURE 4. Now, it is desired to effect the depositing of coins on these same spots of glue, which is effected by the appropriate selection of switches A'S, B'S, C'S in FIGURE 7. It will now be recognized that the respective locations of the individual glue dispensing units A, B, C, etc. in FIGURE 2 with respect to the card correspond to the relative positions of the coin ejection units A', B', C', etc. with respect to the card. If, in FIGURE 4, the switch ES was closed to activate the glue applying unit E, then, in FIGURE 7, switch E'S will be closed to activate coin ejection unit E' to drop a fifty cent piece on the same spot of glue.

Continuing, as the card passes below photoelectric relay 92 the ratchet relay 94 is energized. Assuming that the circuit elements initially were in their positions indicated in FIGURE 7 (except that certain of the switches A'S, B'S, C'S, etc. are closed) switch 96 will break contact with line 100 and make contact with line 102, whereby a circuit will be established through solenoid 110 as well as through those particular solenoids A'Sol., B'Sol., C'Sol., etc. which have been activated by the closing of their respective switches. The energization of these latter solenoids will effect the movement inwardly of the respective arms 72 and fingers 76 (FIGURE 6) to which they are connected, thereby effecting the ejection of coins onto the card. Meanwhile, upon the energization of solenoid 110 its armature 112 will be driven upwardly to strike the push button 108, which will cause the switch 106 to break the circuit through line 102. The respective energized solenoids A'Sol., B'Sol., C'Sol., which have effectived the ejection of coins will now be deenergized to permit the springs 88 to withdraw the fingers 76 in readiness for the next ejection cycle.

*Inspection Unit*

Figure 8:
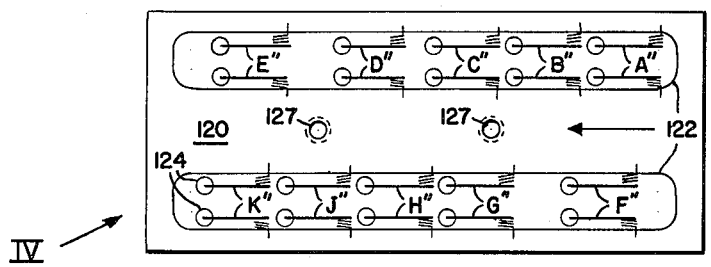
FIGURE 8 is a plan view of a part of the inspection unit.
Figure 9:
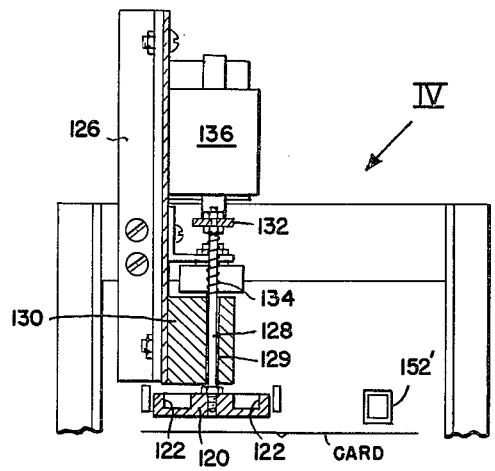
FIGURE 9 is a transverse vertical cross-section of the inspection unit.

Referring to FIGURES 8 to 12, the inspection unit IV will now be described. There is shown in FIGURE 8 a plate 120, preferably of a non-conductive material, having a pair of lengthwise channels 122. It will be noted that there are provided within the channels 122 pairs of holes 124 which pass through the plate 120, there being altogether ten pairs of such holes 124. A guide block 130 is supported by a framework generally indicated at 126 and has a pair of bores 129 containing reciprocating rods 128. The lower ends of rods 128 are threaded into plate 120 at 127, and are spanned at their upper ends by a cross bar 132. Coil springs 134 bottomed against block 130 urge the rods 128 and bar 132 upwardly. A stop screw 133 limits downward movement of bar 132. The assembly comprising bar 132, rods 128 and plate 120 is movable vertically by means of a solenoid 136. Energization of solenoid 136 causes downward movement of bar 132, and this downward movement causes the ends of the bar to strike the push buttons 138 and 142 of a pair of switches 140 and 144, respectively.

Figure 10:
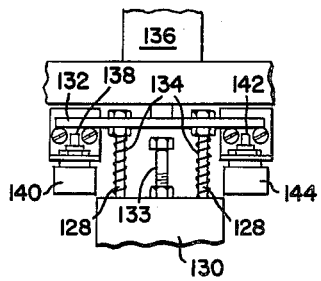
FIGURE 10 is a side elevation of a portion of the structure shown in FIGURE 9.
Figure 11:
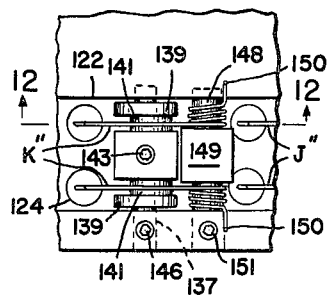
FIGURE 11 is a plan view of one of the individual coin contact assemblies.
Figure 12:
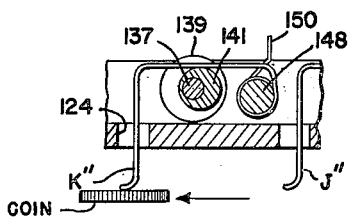
FIGURE 12 is a vertical cross-section taken on line 12—12 of FIGURE 11.
Figure 13:
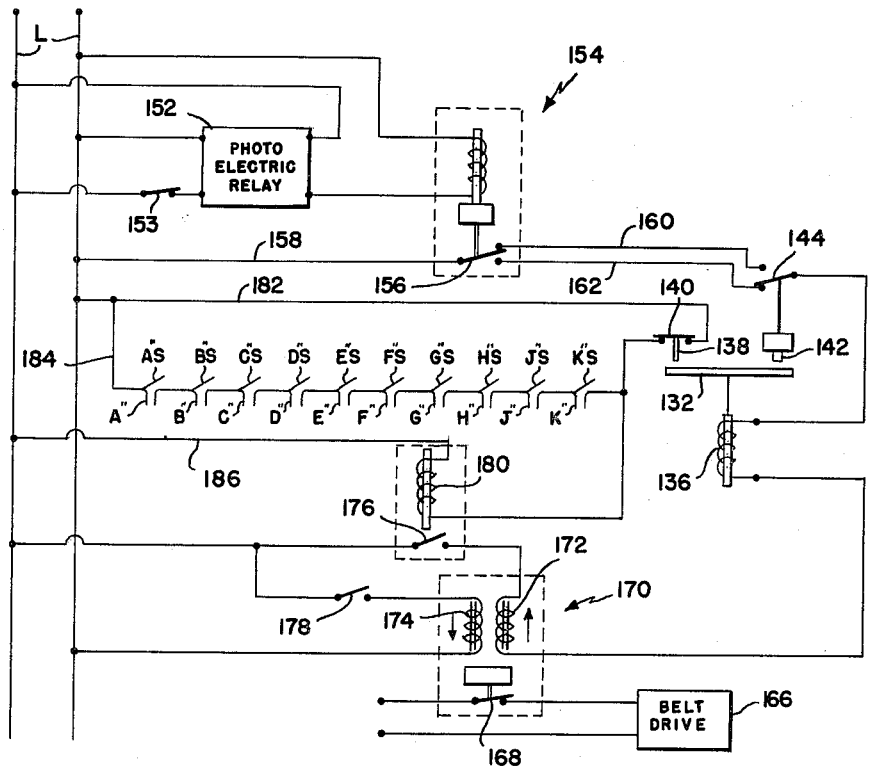
FIGURE 13 is a wiring diagram of the controls for the apparatus shown in FIGURES 8 to 12.

The actual inspection is effected by feeler elements or contacts which are lowered by means of the plate 120 as a card passes thereunder in a direction from the right to the left as viewed in FIGURE 8. If a pair of contacts touches a coin a current will be conducted through the contacts via the coin, thereby indicating its presence. However, in the absence of a coin at a location where it should have been deposited by the coin dispenser III, a current will not be conducted through the contacts and the coin's absence will be indicated. These contacts have positions relative to the card which correspond to the relative positions of the individual glue dispensing units A, B, C, etc. in FIGURE 2 and the coin ejection units A', B', C', etc. in FIGURE 5. The nomenclature employed, therefore, to identify the individual pairs of contacts will involve the use of the same letters as used to indicate the glue dispensing and coin ejection units having the same positions with respect to the card. Thus, in FIGURE 8 there are shown ten pairs of contacts which are identified A'', B'', C'', D'', E'', F'', G'', H'', J'' and K''. The more detailed structure of the contacts K'' and J''—which are typical as all of the pairs of contacts are identical—is illustrated in FIGURES 11 and 12. Each contact assembly involves a rod 137 projecting through the plate 120 and across a channel 122. Rotatably mounted on the rod 137 is a unitary cam structure, desirably formed of a non-conductive material, comprising spaced circular shoulders 139 which are separated by eccentric cams 141. Rod 137 is fixed against rotation in plate 120 by a set screw 146, and the unitary structure comprising shoulders 139 and cams 141 is rotatably adjustable with respect to rod 137 by means of a set screw 143. As shown in FIGURES 11 and 12 the contacts K'' comprise wires which pass over the cams 141, in engagement therewith, and then downwardly through the holes 124. By rotational adjustment of cams 141 the sets of contacts A'', B'', C'', etc. may be individually adjusted in their vertical projection below plate 120. The terminal portions of the wires are coiled about a non-conductive rod 148 mounted in the plate 120 and fixed therein by a set screw 151, there also being provided a non-conductive spacer 149. The electrical leads for the wire contacts K'' are indicated at 150. Referring next to FIGURE 13, there is shown the connection of the respective contacts A'', B'', C'', etc. in the control circuit. As in the case of the glue applicator II and the coin dispenser III, the operation of the inspection unit IV is triggered by a photoelectric relay indicated at 152 and having its pickup positioned as shown at 152' in FIGURE 9. Photoelectric relay 152 is connected across power lines L and has the usual switch 153 provided to shut down the unit. A single pole double-throw ratchet relay 154, similar to previously described relays 36 and 94, is connected across the secondary or controlled circuit of photoelectric relay 152. On each successive energization of relay 154 its switch 156 establishes contact between the line 158 and one of the lines 160, 162 while breaking contact with the other. Switch 144 and solenoid 136, both previously mentioned in referring to FIGURE 10, are connected in series, and it will be understood that when pushbutton 142 is hit by bar 132 it will cause the switch 144 to break contact with one of lines 160, 162 while making contact with the other; when the push button 142 is released and struck a further time this operation will be reversed. Normally closed switch 140, previously mentioned, is connected in parallel with the series connected bank of contacts A'', B'', C'', etc., but both are in series with a relay having a coil 180 and switch 176. Thus the coil 180 may be energized either through a line 182 and normally closed switch 140 or through a line 184 and the bank of contacts A'', B'', C'', etc. The drive for the belt 2 is shown schematically at 166 and has a switch 168 in its line adapted to interrupt its operation. Switch 168 is operated by what may be termed a latching relay 170 having a break coil 172 and a make coil 174. The functioning of relay 170 is such that energization of coil 172 will open switch 168, which then may be closed only by the subsequent energization of coil 174, the energization of coil 174 being effected by the manual closing of a switch 178. The energization of coil 172 to effect opening of switch 168, with consequent interruption of belt drive 166, cannot take place as long as normally closed switch 176 is maintained open by the energization of coil 180. As will be evident hereafter, this is normally the case during operation of the inspection unit IV, which normal operation obviously involves the satisfactory detection of all the coins that should have been deposited on the card by coin dispenser III.

In the circuit there are provided a series of switches each of which may be closed to shunt one of the pairs of contacts A'', B'', C'', etc. Since the pairs of contacts have the same relative positions to the cards as the respective coin ejection units, it is desired to deactivate those contacts corresponding to coin ejection units which were inactive with respect to the given card. Thus, for example, if the coin ejection unit B' in FIGURE 5 was inactive and therefore did not eject a ten cent coin it would be desired to deactivate the contacts B'' so that the inspection unit would not indicate misoperation merely by virtue of the fact that it did not detect a ten cent coin on the card. The switches for effecting this selection of active and inactive contacts are shown in FIGURE 13, and the nomenclature employed in their identification will involve the use of A''S to indicate the switch for shunting contacts A'', the use of B''S to indicate the switch for shunting contacts B'', and so forth. In FIGURE 13 there are shown the series of switches A''S, B''S, C''S, D''S, E''S, F''S, G''S, H''S, J''S, and K''S.

The operation of the inspection unit will now be described. As a card passes from the coin dispenser III to the inspection unit IV, the photoelectric relay 152 will detect the presence of the card beneath the plate 120. At the proper instant the ratchet relay 154 will be energized and, assuming that the circuit elements initially are in their positions indicated in FIGURE 13, the switch 156 will establish contact between line 158 and line 162, thereby to energize solenoid 136. As will be recalled from FIGURE 9, the energization of solenoid 136 effects the lowering of plate 120, with its array of contacts A'', B'', C'', etc., onto the moving card. Assuming that all of the coin ejection units were put into operation to eject coins onto the card, then all of the group of switches A''S, B''S, C''S, will be open, and if all of these coins have been properly placed on the card a circuit will be established from line 184 through coil 180. Coil 180 will then be energized and switch 176 will remain open, whereby coil 172 will not be energized and the belt drive 166 will not be interrupted by the opening of switch 168. However, if all of the selected coin ejection units have not ejected coins onto the card, then the circuit through one of the contacts will remain open and coil 180 will be permitted to deenergize, causing closing of switch 176 and energization of coil 172, which in turn results in opening of switch 168. The belt drive 166 then will be interrupted and will be resumed only by the manual closing of switch 178 to energize the make coil 174.

The plate 120 remains lowered only for an instant, for the reason that as bar 132 is lowered it strikes the push switch 144, causing opening of the circuit through switch 156, line 162 and solenoid 136. The consequent deenergization of solenoid 136 permits springs 134 to retrieve the plate 120 with its contacts. In the meantime, there has been sufficient time for the series of contacts to effect the determination of whether all of the selected coin ejection units have operated properly to drop coins onto the spots of adhesive previously applied.

It will be noted that when solenoid 136 is deenergized and bar 132 is in its raised position the switch 140 remains closed. The purpose of this provision is to maintain a circuit through the coil 180 during periods when a card is not passing for inspection beneath the plate 120. With coil 180 constantly energized the switch 176 will not close to effect interruption of the belt drive 166. It will be noted, however, that while plate 120 is in its lowered position the bar 132 opens this switch 140.

*Folding, Inserting and Postage Metering*

The folder V, inserting machine VI and postage metering machine VIII are conventional equipment and need not be described.

Figure 14:
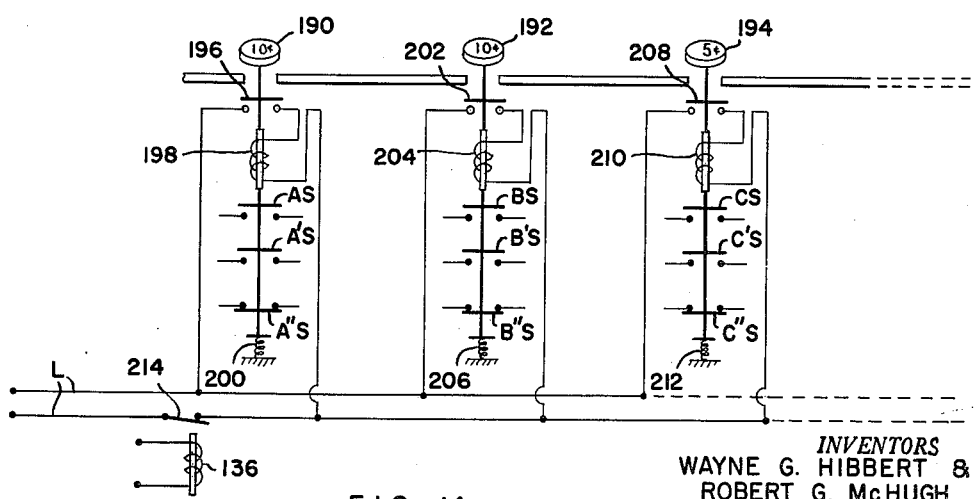
FIGURE 14 is a wiring diagram of an arrangement for controlling the glue applicator, coin dispenser and inspection unit from a single keyboard.

*Keyboard Selection, FIGURE 14*

According to the preceding description the glue applicator II, coin dispenser III and inspection unit IV have their own individual groups of switches for the selection of those points on a card at which a spot of glue is to be applied, a coin ejected and inspection effected. For certain coin mailing programs for which the apparatus is applied many cards, perhaps hundreds or thousands, will be run through the apparatus, all of these cards having mounted thereon the same combination of coins. In such a case the respective groups of selection switches for glue applying, coin ejection and inspection may be set manually for each run of cards. However, there are some situations in which each card to be run is to receive a different combination of coins, and in such cases facility of selection is of importance. Accordingly, there will be described with reference to FIGURE 14 a single keyboard arrangement whereby the groups of selection switches for the glue applicator, coin dispenser and inspection unit may be set simultaneously. Assume, by way of example, that on a given card it is desired to mount a ten cent piece ejected from the coin ejection unit A′ in FIGURE 5. Ordinarily, the application of a spot of glue at the proper point on the card will be effected by closing the switch AS in FIGURE 4 to activate the individual glue applying unit A in FIGURE 2. The switch A′S in FIGURE 7 would be closed to activate the coin ejection unit A′ in FIGURE 5. Also, switch A″S would be opened to activate the contacts A″ in FIGURE 13, all other such contacts which are to be activated also having their switches opened and the remaining switches being closed. The closing of switches AS and A′S and the opening of switch A″S can be effected in a single operation as will be presently described. Referring to FIGURE 14 then, there are shown keys 190, 192 and 194. Key 190 operates a switch 196, to which are ganged also the aforementioned switches AS, A′S and A″S. Switch 196 has a holding coil 198 which is energized when switch 196 is closed by being connected across power lines L. A spring 200 maintains switches AS and A′S in open condition when key 190 is in its upper position, while maintaining switch A″S in its closed position. Similarly, key 192 operates a switch 202 also having a holding coil 204, a spring 206 being provided. Switch 202 is ganged to switches BS, B′S and B″S. Key 194 operates switch 208 having a holding coil 210, and a spring 212 is provided. Switch 208 is ganged to switches CS, C′S and C″S. It will be apparent that once a key 190, for example, is depressed its holding coil 198 will prevent it from returning after it is released. The key 190 can be released only by the breaking of the circuit through holding coil 198. To this end there is provided a normally closed switch 214 which is opened each time the solenoid 136, previously described with reference to FIGURE 13, is energized. It will be noted that the temporary opening of switch 214 will break the circuit through each of the holding coils 198, 204 and 210. The depression of the key 190 places in operation the glue dispensing unit A (FIGURE 2), the ten cent coin ejection unit A′ (FIGURE 5) and the coin detection contacts A″ (FIGURE 8). The depression of key 192 places in operation the glue applying unit B, the ten cent coin ejection unit B′, and the coin inspection contacts B″. Similarly, depression of key 194 activates glue applying unit C, the five cent coin ejection unit C′ and the contacts C″. It will be evident that the keyboard arrangement for selectively effecting the mounting of the other coins, namely twenty-five cent, fifty cent, one dollar and one cent pieces, is merely a repetition of that shown in FIGURE 14. Therefore, it is unnecessary to extend the diagram of FIGURE 14 to the right in FIGURE 14, as indicated by the broken line. Briefly summarizing the operation of the keyboard arrangement of FIGURE 14, keys 190, 192 and 194 will be depressed if two ten cent pieces and a five cent piece are to be mounted on a card. Each of the holding coils 198, 204 and 210 will be energized, and the respective ganged switches for the glue applying and coin ejection units will be closed while the respective switches for the inspection contacts will be opened. The ensuing operation of the glue applicator II, coin dispenser III and inspection unit IV is exactly as hereinbefore described. It will be recalled from the operation of the inspection unit that solenoid 136 was energized for a brief interval to effect the lowering of plate 120 onto the card. As the card finally passes the coin inspection unit, therefore, provided that the belt drive 166 is not interrupted by the absence of a coin where intended, the energization of solenoid 136 will open switch 214. This in turn will break the circuit through holding coils 198, 204 and 210 and permit the keys to return to their upper positions. Such return will indicate to the keyboard operator that a second card may be fed to the apparatus and a further selection of a coin combination to be mounted may be made. It is contemplated that the keyboard operator may first make a selection on the keyboard and then manually feed a card onto the belt 2. It is also contemplated that information previously written on the card may indicate to the operator the monetary value of coins that should be mounted on that particular card.

*Conclusion*

It will be evident from the foregoing description that there is provided complete mechanization for the mounting of coins on cards preparatory to mailing. The mounting operation is rapid, and there is no longer the need for the manual insertion of coins under tabs. Furthermore, the cards calling for different combinations of coins may be fed to the machine at random, since the keyboard arrangement provides for the selection of coins individually for each card.

It will be understood that various departures from the specifically disclosed embodiment of the invention may be made without departing from the scope of the invention as defined by the following claims.

We claim:

1. For use in mounting articles on cards, the combination comprising an array of individual applicator means for applying adhesive on said cards in various arrays of separate points, individual actuator means connected to actuate each of said applicator means, selector means connected to each of said individual actuator means for selectively actuating said applicator means for producing selected arrays of adhesive on said cards, an array of individual article depositing means, means for conveying said cards from said applicator means to said depositing means, individual actuator means connected to each of said article depositing means, and means connected to each of said second recited actuator means for operating only those of said depositing means corresponding to selected applicator means for depositing articles on said cards only at the selected points at which adhesive has been applied by said selected applicator means.

2. For use in mounting articles on cards, the combination comprising an array of individual applicator means for applying adhesive on said cards in various arrays of separate points, individual actuator means connected to actuate each of said applicator means, selector means connected to each of said individual actuator means for selectively actuating said applicator means for producing selected arrays of adhesive on said cards, an array of individual article depositing means, means for conveying said cards from said applicator means to said depositing means, individual actuator means connected to each of said article depositing means, and selector means connected to each of said second recited actuator means for selectively operating said individual depositing means for depositing articles on said cards only at the selected points at which adhesive has been applied by said selected applicator means.

3. For use in mounting articles on cards, the combination comprising an array of individual applicator means for applying adhesive on said cards in various arrays of separate points, individual actuator means connected to actuate each of said applicator means, selector means connected to each of said individual actuator means for selectively actuating said applicator means for producing selected arrays of adhesive on said cards, an array of individual article depositing means, means for conveying said cards from said applicator means to said depositing means, individual actuator means connected to each of said article depositing means, selector means connected to each of said second recited actuator means for selectively operating said individual depositing means for depositing articles on said cards only at the selected points at which adhesive has been applied by said selected applicator means, and programming means connected to said first and second selector means for simultaneously programming said individual applicator means and individually corresponding depositing means for respective actuation by said first and second actuator means.

4. For use in mounting articles on cards, the combination comprising an array of individual applicator means for applying adhesive on said cards in various arrays of separate points, individual actuator means connected to actuate each of said applicator means, selector means connected to each of said individual actuator means for selectively actuating said applicator means for producing selected arrays of adhesive on said cards, an array of individual article depositing means, means for conveying said cards from said applicator means to said depositing means, individual actuator means connected to each of said article depositing means, means connected to each of said second recited actuator means for operating only those of said depositing means corresponding to selected applicator means for depositing articles on said cards only at the selected points at which adhesive has been applied, and detector means for detecting whether an article has been deposited at each of said selected points by said depositing means.

5. For use in mounting articles on cards, the combination comprising an array of individual applicator means for applying adhesive on said cards in various arrays of separate points, individual actuator means connected to actuate each of said applicator means, selector means connected to each of said individual actuator means for selectively actuating said applicator means for producing selected arrays of adhesive on said cards, an array of individual article depositing means, means for conveying said cards from said applicator means to said depositing means, individual actuator means connected to each of said article depositing means, means connected to each of said second recited actuator means for operating only those of said depositing means corresponding to selected applicator means for depositing articles on said cards only at the selected points at which adhesive has been applied, detector means for detecting whether an article has been deposited at each of said selected points, and programming means connected to said selector means and said detector means for simultaneously programming said selector and detector means.

References Cited in the file of this patent

UNITED STATES PATENTS

| | | |
|---|---|---|
| 1,644,044 | Urie | Oct. 4, 1927 |
| 2,170,068 | Taylor et al. | Aug. 22, 1939 |
| 2,525,612 | McKay et al. | Oct. 10, 1950 |
| 2,806,621 | Drennan | Sept. 17, 1957 |